(12) United States Patent
Kang et al.

(10) Patent No.: US 7,895,825 B2
(45) Date of Patent: Mar. 1, 2011

(54) METHOD AND APPARATUS FOR REDUCING EXHAUST GAS INCLUDING HYDROCARBONS DURING INITIAL COLD START PERIOD

(75) Inventors: Hee Chun Kang, Ansan (KR); Tae-Woo Lee, Ansan (KR); Eun-Seok Kim, Ansan (KR); Hyun-Sik Han, Ansan (KR); Tae Hun Yeon, Ansan (KR)

(73) Assignee: Heesung Engelhard Corporation, Shiheung, Kyungki-do (KR)

( * ) Notice: Subject to any disclaimer, the term of this patent is extended or adjusted under 35 U.S.C. 154(b) by 666 days.

(21) Appl. No.: 11/784,044

(22) Filed: Apr. 5, 2007

(65) Prior Publication Data

US 2007/0245717 A1    Oct. 25, 2007

(30) Foreign Application Priority Data

Apr. 25, 2006  (KR) ...................... 10-2006-0036978
Aug. 28, 2006  (KR) ...................... 10-2006-0081655

(51) Int. Cl.
*F01N 3/00* (2006.01)
*F01N 3/10* (2006.01)
*F02B 35/00* (2006.01)

(52) U.S. Cl. ............................. 60/284; 60/274; 60/285; 60/289; 60/299; 60/315

(58) Field of Classification Search ................. 60/284, 60/285, 289, 315, 3, 299, 273, 274
See application file for complete search history.

(56) References Cited

U.S. PATENT DOCUMENTS

| | | | | | |
|---|---|---|---|---|---|
| 5,560,202 | A | * | 10/1996 | Hosoya et al. | 60/284 |
| 5,979,157 | A | * | 11/1999 | Kinugasa et al. | 60/274 |
| 6,619,032 | B2 | * | 9/2003 | Kakuyama et al. | 60/277 |

FOREIGN PATENT DOCUMENTS

JP            03179132 A  *  8/1991

* cited by examiner

*Primary Examiner*—Thomas E Denion
*Assistant Examiner*—Audrey Klasterka
(74) *Attorney, Agent, or Firm*—Ohlandt, Greeley, Ruggiero & Perle, L.L.P.

(57) ABSTRACT

Disclosed herein is a method and apparatus for reducing exhaust gases in an initial cold start period, in which a main catalyst unit is connected to an engine through an exhaust pipe, including the steps of receiving signals for stopping engine operation from an engine, and removing engine exhaust gases remaining in an exhaust pipe located at an inlet of a main catalyst unit.

1 Claim, 5 Drawing Sheets

METHOD AND APPARATUS FOR REDUCING EXHAUST GAS INCLUDING HYDROCARBONS DURING INITIAL COLD START PERIOD

BACKGROUND OF THE INVENTION

1. Field of the Invention

The present invention relates to a method and apparatus for reducing exhaust gases, including hydrocarbons, in an initial cold start period, and, more particularly, to a method and apparatus for reducing exhaust gases, such as hydrocarbons, generated during an automobile low-temperature start.

2. Description of the Related Art

A catalyst device for reducing automobile exhaust gases including carbon monoxide (CO), hydrocarbons (HC) and nitrogen oxides ($NO_x$), which are principal causes of air pollution, is widely used. However, most of the exhaust gases discharged from automobiles are generated in a period of heating a catalyst, that is, a period (cold start period or low-temperature start period) continuing until the temperature of a catalyst reaches an operation temperature (about 300° C.~450° C.), at which a catalyst exhibits optimal catalytic conversion efficiency. Since the cold start spans a time period ranging from several tens of seconds to several minutes, various attempts to minimize exhaust gases during the low-temperature start period have been made. For reference, the "light-off temperature" in a catalyst is defined as the temperature at the point at which catalytic conversion efficiency surpasses 50%. Only when the temperature of the catalyst reaches the light-off temperature, the catalyst oxidizes both carbon monoxide (CO) and hydrocarbons (HC) and reduces nitrogen oxides ($NO_x$), thereby converting them into harmless gases.

Accordingly, a method of mounting an electric heater or a burner on a catalyst device, that is, a catalyst preheating method, or a method of using heat included in exhaust gases discharged from an engine by closely mounting a catalyst device to an engine, that is, a close mounting method, has been used in order to help a catalyst reach the light-off temperature. Further, a method of purifying hydrocarbons in which hydrocarbons (HC), which are discharged in large quantities from an engine and pass through a catalyst device, are adsorbed on a separate trap, and are then discharged from the trap after the temperature of a catalyst reaches the light-off temperature, that is, an HC trap method, has been developed.

However, the above methods have various problems. For example, the close mounting method has a problem in that, when an engine normally operates, the temperature of a catalyst in the catalyst device increases excessively, thereby decreasing the expected life span of a catalyst. The HC trap method has a problem in that durability is reduced. Further, the above methods have a problem in that a large amount of precious metals, used to decrease the light-off temperature of a catalyst, entails high processing costs.

SUMMARY OF THE INVENTION

The present invention has been made with the object of reducing automobile exhaust gases in an initial cold start period, which could not been accomplished in spite of the above various attempts and developments.

The present invention has been completed based on the fact that the concentration of hydrocarbons (HC) measured at the outlet end of catalyst device is higher than the concentration of hydrocarbons (HC) discharged from an engine at the start of engine operation, and on the fact that oxygen included in a catalyst is helpful for purifying hydrocarbons (HC). That is, the present invention has been completed based on the fact that, when the engine start to operate, exhaust gases discharged from the engine are mixed with exhaust gases that were discharged from the engine at the time of previous engine operation and then remain behind, and are then discharged together with them, and, in this case, the exhaust gases can be controlled in an initial cold start period if the previously generated exhaust gases remaining in an exhaust pipe before the start of engine operation can be removed and oxygen can be supplied and stored in this process.

Accordingly, an object of the present invention is to provide a method and apparatus for controlling the discharge of air pollutants within a specified range by reducing automobile exhaust gases in a cold start period.

The above object is accomplished by removing hydrocarbons (HC) remaining at the inlet end of a main catalyst unit by injecting air or compressed air into the inlet end thereof and supplying oxygen thereto at the time that engine operation is stopped.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
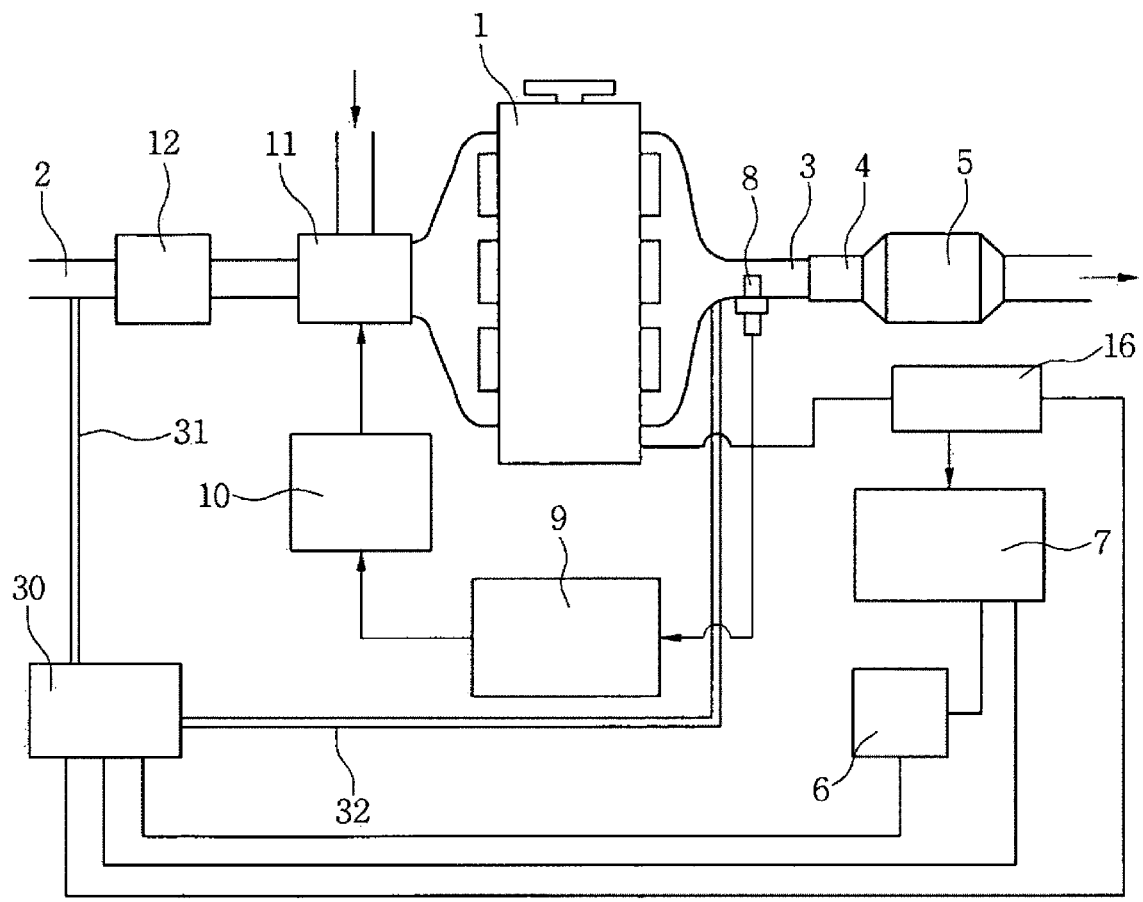
FIG. 1 is a schematic view showing an apparatus for reducing exhaust gases according to a first embodiment of the present invention.

Hereinafter, preferred embodiments of the present invention will be described in detail with reference to the attached drawings.

Reference now should be made to the drawings, in which the same reference numerals are used throughout the different drawings to designate the same or similar components.

A first embodiment of the present invention will be described in detail with reference to FIG. 1.

FIG. 1 shows a system for reducing exhaust gases in an initial start period in an engine 1, which can use fuel such as gasoline, LPG or natural gas, according to the present invention. The engine 1 is provided with a suction pipe 2 and an exhaust pipe 3 on the inlet and outlet thereof. Exhaust gases discharged from the engine 1 are guided through a catalyst device including a main catalyst unit 5 provided on the exhaust pipe 3. Generally, the main catalyst unit 5 has a structure in which a honeycomb ceramic support is coated with a catalytic component mainly composed of any one of platinum group metals or a combination thereof. In particular, it is preferred that the main catalyst unit 5 include a cylindrical ceramic support of 4.66×6400 cpsi, with a PM weight of 50 g/ft$_3$ an a ratio of Pt to Rh of 5:1.

An apparatus for reducing exhaust gases according to a first embodiment of the present invention includes an air pump 30 which is electrically controllable. Air is supplied to the air pump 30 through a first air channel 31, and the first air channel 31 is connected to the suction pipe 2, located at the inlet end of an air flowmeter 12. The air pump 30 is operated such that the supplied air is injected to the exhaust pipe 3 located upstream of the main catalyst unit 5 through a second air channel 32. The second air channel 32 is connected to the exhaust pipe 3 located upstream or downstream of a lambda sensor 8. The lambda sensor, disposed to detect oxygen included in exhaust gases, is connected to an electronic unit 9 for transmitting signals from the lambda sensor 8 to a compensation unit 10. The compensation unit 10 is provided to determine signals related to the mixture of air and fuel and to transmit the signals to an injection unit 11 in the engine 1. The injection unit 11 is generally used at the place where the air flowmeter 12 is connected to an apparatus. The air pump 30 may include a check valve (not shown) serving to protect the air pump 30 from high-temperature exhaust gases reversely flowing toward the air pump 30. The air pump 30 is connected to an output terminal of an electronic switch 7 and a battery 6.

According to the present invention, the air pump 30 is connected to the battery 6 functioning to start an automobile, and the electronic switch 7 is a semiconductor type switch for minimizing damage and supplying electric current to the air pump 30 without danger of the generation of electromagnetic pulses, which is a phenomenon frequently occurring in automobiles. The electronic switch 7 may also be a relay type switch.

Further, an apparatus for reducing exhaust gases according to the first embodiment of the present invention includes a computer type control unit 16 designed to be connected to the electronic switch 7 and the air pump 30 and to transmit control signals thereto.

The control unit 16 serves to monitor an operation of supplying electric current from the battery 6 or a generator (not shown) in automobiles to the air pump 30 based on stop signals transmitted from the engine 1, and serves to control the operation of the air pump 30.

Hereinafter, the functions of the apparatus for reducing exhaust gases in an initial cold start period according to the present invention will be described based on the above constitution.

Exhaust gases discharged from the engine 1 in operation are converted into harmless gases by a catalytic reaction while they pass through the main catalyst unit 5 along the exhaust pipe 3. As such, the air pump 30 and the units for controlling the same do not operate during the engine operation period, but the processes for removing pollutants remaining in the exhaust pipe 3 are started by the control unit 16 having received signals from the engine 1 the moment the engine is stopped. The electronic switch 7 starts to be operated by the control unit 16 and then operates the air pump 30, and the air pump 30 sucks air from the suction pipe 2 through the first air channel 31 and then injects air into the exhaust pipe 3 through the second air channel 32, thereby pushing exhaust gases remaining in the exhaust pipe 3, located at the inlet end of the main catalyst unit 5, into the main catalyst unit 5. It is preferred that air be injected for 5~10 seconds. When the injection of a predetermined amount of air is completed by the air pump 30, the injection of air is stopped by the control unit 16.

Hereinafter, the efficiency of the purification of exhaust gases, which can be obtained by removing exhaust gases remaining in the exhaust pipe, will be described based on the first constitution, described above.

Figure 2:
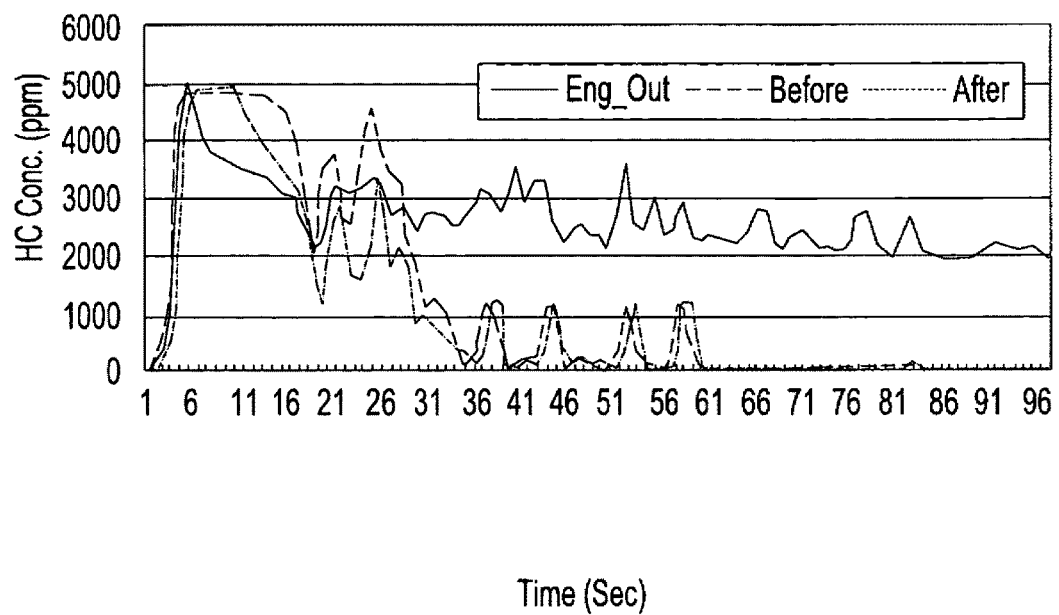
FIG. 2 is a graph showing the concentration of HC discharged from an engine according to the first embodiment of the present invention.
Figure 3:
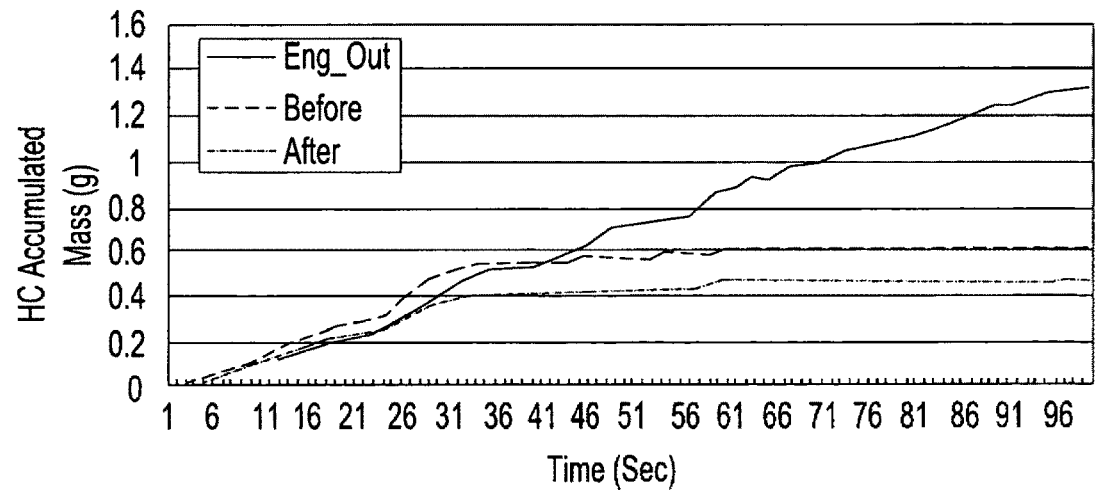
FIG. 3 is a graph showing the accumulated mass of HC discharged from an engine according to the first embodiment of the present invention.

FIG. 2 is a graph showing the concentration of hydrocarbons (HC) discharged from an engine in an initial start period. As shown in FIG. 2, the concentration of hydrocarbons (HC) discharged from the engine is higher than the concentration of hydrocarbons (HC) discharged through the main catalyst unit in a period of 20 seconds or less. The reason is that hydrocarbons (HC) discharged in a previous engine operation remain in an exhaust pipe located at the inlet end of the main catalyst unit. In FIG. 2, "before values" means values measured in a state in which the apparatus for reducing exhaust gases in an initial cold start period according to the present invention is not provided, and "after values" means values measured in a state in which exhaust gases remaining in an exhaust pipe are removed by the apparatus for reducing exhaust gases of the present invention. As shown in FIG. 2, it was found that the concentration of hydrocarbons (HC) was considerably decreased in a period of 10~30 seconds in the initial engine start period, compared to that in conventional apparatuses for reducing exhaust gases. FIG. 3 is a graph showing the accumulated mass of hydrocarbons (HC) measured in FIG. 2. From the result shown in FIG. 3, it was found that an effect of reducing hydrocarbons (HC) by an amount of 25% can be obtained.

Meanwhile, another object of the present invention can be accomplished through a method of discharging residual exhaust gases by, immediately after the engine is stopped, stopping the supply of fuel to an engine while performing a cranking process, thereby injecting only external air into the inlet end of a main catalyst unit, according to a second embodiment of the present invention.

According to the second embodiment of the present invention, a method of reducing exhaust gases includes a first step of determining whether or not engine rotation is stopped; a second step of performing a cranking process by applying a power source to a cranking motor immediately after the engine rotation is stopped in the first step; a third step of turning off a fuel pump while performing the second step; a fourth step of monitoring output values transmitted from an oxygen sensor provided in the inlet end of a main catalyst unit; and a fifth step of stopping the second step in the case where the output values are not more than predetermined values. Accordingly, air is sucked from the exterior concomitantly with the stopping of engine operation, and is then injected into a main catalyst unit, thereby removing exhaust gases including hydrocarbons remaining in the inlet end of the main catalyst unit.

In the first step, various means can be considered in order to determine whether or not engine rotation has stopped. Preferably, the engine stop state can be determined by checking whether or not a start switch has been turned off, checking output signals transmitted from an engine speed sensor, or checking output signals transmitted from a water temperature sensor. In the second embodiment of the present invention, in a state in which, immediately after the engine is stopped, a process of cranking an engine is performed, and simultaneously an operation of a fuel pump is stopped, thereby preventing fuel from being supplied to a cylinder, residual exhaust gases in previous operations can be discharged by injecting air sucked from the exterior into the inlet end of the main catalyst unit.

The second embodiment of the present invention will be described in detail with reference to FIGS. 4 to 5.

Figure 4:
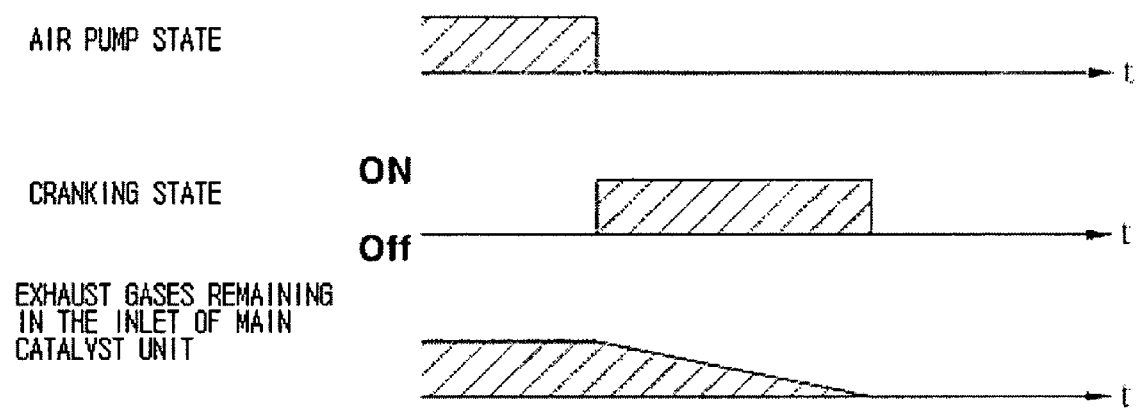
FIG. 4 is a graph showing the state of control variables according to a second embodiment of the present invention.
Figure 5:
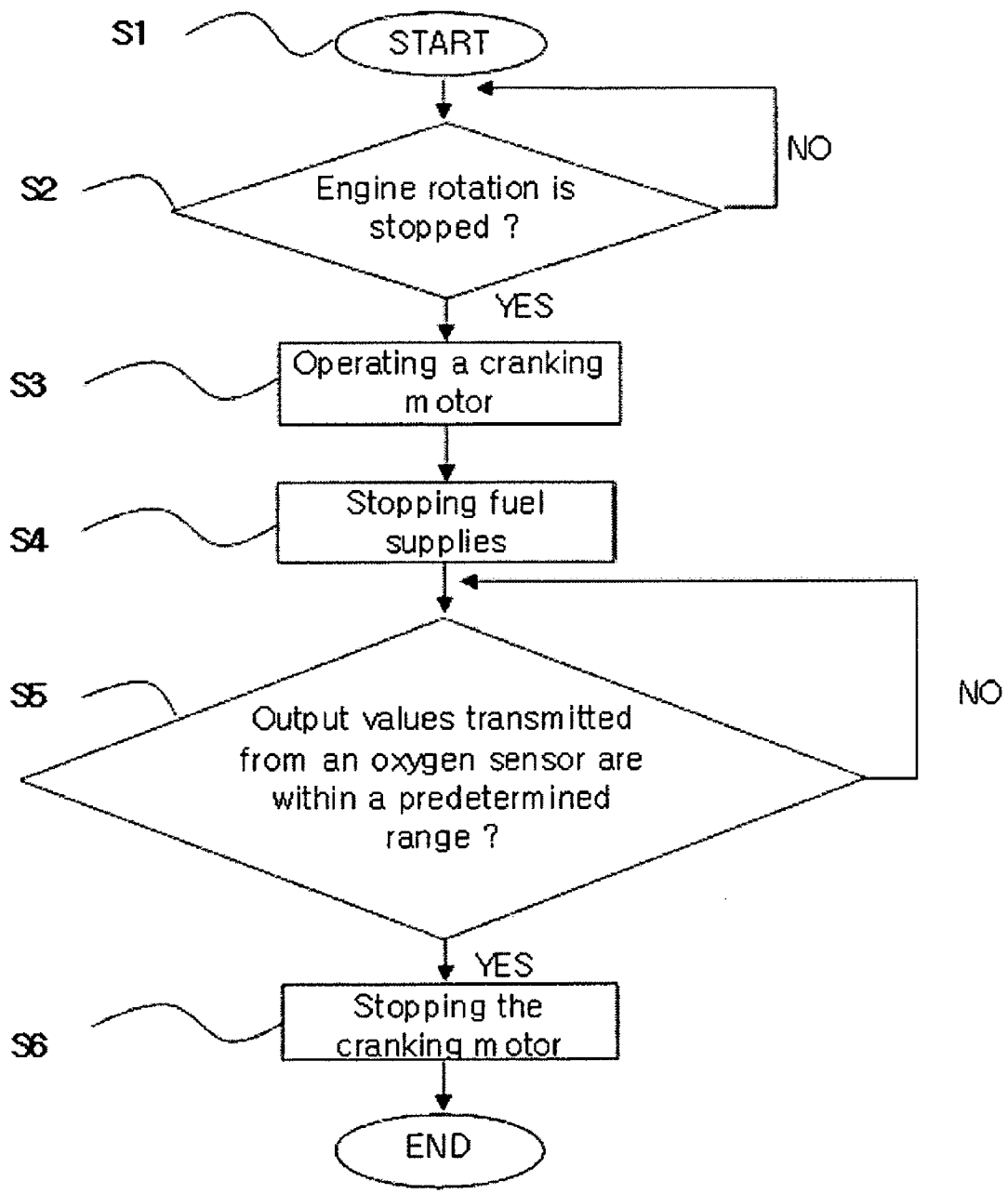
FIG. 5 is a flowchart showing a method of reducing exhaust gases according to the second embodiment of the present invention.

FIG. 4 is a graph showing the state of control variables according to the second embodiment of the present invention. Here, after an engine is stopped, the operation of a fuel pump is stopped, thereby preventing fuel from being supplied to a cylinder. Simultaneously, a start motor is rotated by an electronic control unit, and the start motor rotates a flywheel. This rotation of the flywheel is transmitted to a crankshaft, and thus reciprocates a piston in a cylinder according to a predetermined cycle. However, since the fuel supply is interrupted, only air sucked from the exterior is injected into a main catalyst unit. When the cranking operation is performed, exhaust gases, such as hydrocarbons (HC), remaining in the main catalyst unit can be discharged to the exterior, and thus the concentration of the discharged hydrocarbons (HC) can be reduced in an initial cold start period. The cranking operation may be performed for any predetermined time, but is preferably performed until constant values are obtained by monitoring output values transmitted from an oxygen sensor located at the inlet end of the main catalyst unit.

Hereinafter, the operation in the method according to the present invention will be described in detail with reference to FIG. 5.

If operation in the method according to the present invention is started during normal engine operation (S1), whether or not engine rotation is stopped is determined (S2). For example, if a start key is not turned off, subsequent steps are not performed until it is turned off.

In step 2 (S2), if it is determined that the start key is turned off, an electronic control unit generates signals for operating a cranking motor, and a cranking process is performed in response to the signals (S3), thereby injecting air sucked from the exterior into a main catalyst unit. The electronic control unit generates signals for stopping fuel injection simultaneously when the cranking process is performed (S4), thereby stopping fuel supplies to a cylinder through each injector.

When the cranking process is performed in a state in which the supply of fuel is interrupted in step 3 and 4 (S3 and S4), air can be sucked from the exterior, and the sucked air can be injected into an exhaust pipe provided with the main catalyst unit in a state in which it is not mixed with fuel. If output values in a predetermined range are obtained by monitoring the output values transmitted from an oxygen sensor provided at the inlet end of the main catalyst unit (S5), the electronic control unit generates signals for stopping a cranking motor. Then, the operation in the method according to the present invention ends.

Figure 6:
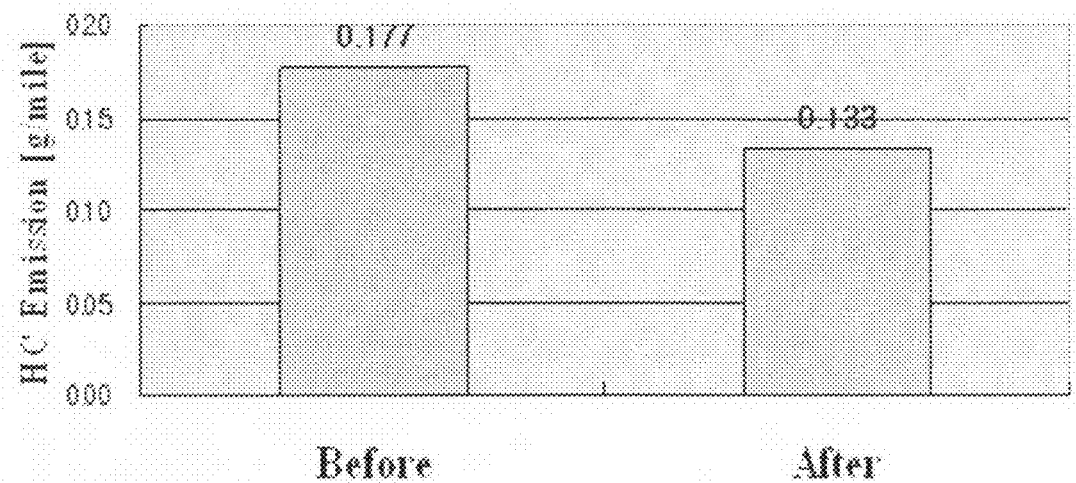
FIG. 6 is a graph showing the concentration of HC discharged from an engine, measured in cold start period, according to the second embodiment of the present invention.
Figure 7:
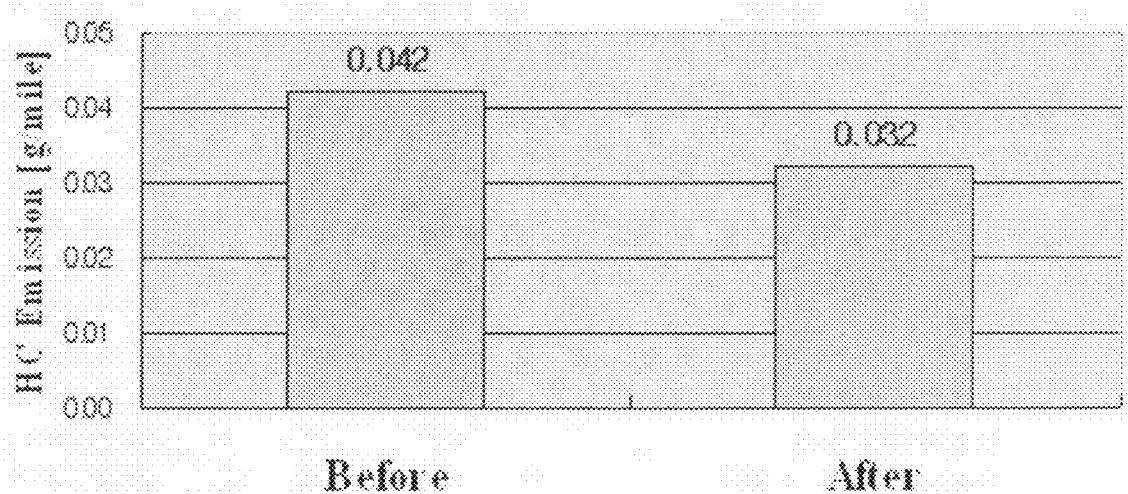
FIG. 7 is a graph showing the accumulated concentration of HC discharged from an engine, measured in total periods, according to the second embodiment of the present invention.

FIG. 6 is a graph showing the concentration of HC discharged from an engine, measured in cold start period, according to a second embodiment of the present invention, and FIG. 7 is a graph showing the accumulated concentration of HC discharged from an engine, measured in total periods, according to the second embodiment of the present invention. The above tests were conducted by applying a Pd/Rh type main catalyst unit. In these tests, the discharge amount of hydrocarbons (HC) in period 1 is reduced at a ratio of 24.5%, and the discharge amount of hydrocarbons (HC) in total periods is reduced at a ratio of 23.8%.

Meanwhile, the method and apparatus for reducing exhaust gases in an initial cold start period according to the present invention is illustrative. The reduction of exhaust gases is accomplished by removing exhaust gases remaining upstream of a main catalyst unit and supplying oxygen to a catalyst immediately after the stop of engine operations. In the embodiments of the present invention, an air injection method using an air pump or a cranking operation is described, but is not limited thereto. Here, it goes without saying that exhaust gases can be removed by sucking exhaust gases remaining in an exhaust pipe and discharging them to the exterior, or can be discharged to the exterior by converting the exhaust gases into harmless gases via a catalytic reaction in the case where a catalyst exists in optimal state by employing some trapping means and reversely discharging the exhaust gases into the exhaust pipe after the temperature of the catalyst reaches a light-off temperature. Further, in the fuel injection using an air pump, which is not limited to the embodiments, it goes without saying that the air pump can be replaced with an air compressor connected to an engine by a belt or a timing gear, or a subsidiary tank for storing air supplied from the air compressor.

What is claimed is:

1. A method of reducing exhaust gases during an initial cold start period, in which a main catalyst unit is connected to an engine through an exhaust pipe, comprising:
    a first step of determining whether or not engine rotation is stopped;
    a second step of performing a cranking process by applying a power source to a cranking motor immediately after the engine rotation is stopped in the first step;
    a third step of turning off a fuel pump while performing the second step;
    a fourth step of monitoring output values transmitted from an oxygen sensor provided in an inlet end of a main catalyst unit; and
    a fifth step of stopping the second step in the case where the output values are not more than predetermined values, wherein the fifth step stops the second step based on the output values transmitted from the oxygen sensor only.

* * * * *